United States Patent
Kieser et al.

(10) Patent No.: US 7,390,842 B2
(45) Date of Patent: Jun. 24, 2008

(54) PIGMENT COMPOSITION FOR PLASTICS

(75) Inventors: Manfred Kieser, Darmstadt (DE); Emil F. Aust, Mainz (DE); Hans-Jürgen Brehm, Lindenfels (DE)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 587 days.

(21) Appl. No.: 10/954,272

(22) Filed: Oct. 1, 2004

(65) Prior Publication Data
US 2005/0143493 A1 Jun. 30, 2005

(30) Foreign Application Priority Data
Oct. 1, 2003 (DE) ................. 103 45 647

(51) Int. Cl.
*C09D 5/29* (2006.01)
*C08K 3/04* (2006.01)

(52) U.S. Cl. .............. 523/171; 524/439; 524/440; 524/441

(58) Field of Classification Search .......... 523/171; 524/439, 440, 441
See application file for complete search history.

(56) References Cited

U.S. PATENT DOCUMENTS

| 3,125,547 A | 3/1964 | Blatz |
| 4,287,112 A * | 9/1981 | Berghmans .......... 524/441 |
| 4,904,735 A | 2/1990 | Chapman, Jr. et al. |
| 5,089,200 A | 2/1992 | Chapman, Jr. et al. |
| 6,048,939 A | 4/2000 | Priester |
| 6,761,764 B2 | 7/2004 | Krendlinger et al. |
| 2004/0253387 A1* | 12/2004 | Cavero .......... 427/458 |

FOREIGN PATENT DOCUMENTS

| WO | WO 98/14517 | 4/1998 |
| WO | WO 98/30619 | 7/1998 |
| WO | WO 01/85855 | 11/2001 |
| WO | WO 02/066544 | 8/2002 |

OTHER PUBLICATIONS

Product Information, "Simple, effective, easy to process," Viton FreeFlow, A Product of DuPont Dow Elastomers.
Product Information, "Easier processing gives you a clear advantage for optimum performance," Viton FreeFlow, A Product of DuPont Dow Elastomers.
Product Information, "Product selection guide," Viton FreeFlow, A Product of DuPont Dow Elastomers.
Plastics Additives & Compounding, "Fluoroelastomer processing aids meet extrusion needs," Jan. 2002, pp. 23-25.

* cited by examiner

*Primary Examiner*—Edward J Cain
(74) *Attorney, Agent, or Firm*—Millen, White, Zelano & Branigan, P.C.

(57) ABSTRACT

The invention includes pigment compositions for plastics comprising one or more flake-form effect pigments, a carrier material and one or more fluorine-containing polymers, to a process for the preparation of the pigment compositions, and to the use thereof for pigmenting plastics and for the production of masterbatches.

20 Claims, No Drawings

PIGMENT COMPOSITION FOR PLASTICS

The present invention in one aspect relates to pigment compositions for plastics comprising one or more flake-form effect pigments, a carrier material and one or more fluorine-containing polymers, to a process for the preparation of the pigment compositions, and to the use thereof for pigmenting plastics and for the production of masterbatches.

There is a large number of processes for the processing of plastics. A particular class of such processes comprises the extrusion processes for the production of, for example, pipes, profiles, tubes or wires from thermoplastics. When carrying out extrusion processes, a number of difficulties occur. Thus, undesired streaks, grooves or bubbles can occur, which impair the transparency, but also the mechanical properties of the extrudates.

In order to avoid these processing faults, a number of process modifications or adaptations of the plastic compositions have been proposed. U.S. Pat. No. 5,089,200 describes a melt extrusion process in which the extrusion dies employed are coated with one or more metal oxides and fluorine-containing polymers are bonded to the metal-oxide surface. This procedure has the disadvantage that the fluorine-containing polymers can be detached by wear and thus cannot eliminate the processing faults in the long term.

U.S. Pat. No. 4,904,735 discloses the addition of fluorine-containing polymers to plastics in order to improve the extrusion properties. The plastics processor has to determine the optimum content of the fluorine-containing polymer and then individually provide each plastic to be processed with the fluorine-containing polymer. This is too complex for plastics processors and is very expensive since additional mixers are necessary.

On use of flake-form effect pigments in plastics processing processes, in particular in extrusion, additional difficulties occur. The poor flow behavior of flake-form pigments, such as, for example, mica, has long been known. In a large number of applications, in particular in the printing and paints sector, this does not result in serious problems. On incorporation into plastics, however, the poor flow behavior of these pigments proves to be problematic. The formation of so-called fisheyes in the resultant articles proves to be particularly interfering during processing, having a disadvantageous effect on the appearance and the mechanical properties of the plastic articles. The moldings fracture easily at the fisheyes under low mechanical load and are thus unsuitable for later use. The precise cause of the fisheye formation is not known. Various formation mechanisms have been discussed in the past without a generally recognized mechanism proving to be correct. The only certain fact is that the fisheyes form during the extrusion process and were not present either in the effect pigment-containing compound used or in the effect pigment-containing masterbatch. In addition, the fisheyes have a high pigment content and occur principally on use of moulds having non-optimum surface quality. The degree of fisheye formation is furthermore also dependent on the individual entire plant. Since fisheyes which occur cannot be removed subsequently, this is a very serious and expensive problem for the processor, but also for masterbatch, compound and effect pigment manufacturers. In addition, pronounced formation of dust occurs during the processing of pearlescent pigments, for example in the production of masterbatches, which requires increased equipment complexity for elimination of the dusts and for cleaning the machines.

The object was therefore to provide pigment compositions comprising flake-form effect pigments which are simple to prepare, are non-dusting and free-flowing and in addition reduce or completely prevent the formation of fisheyes during further processing, in particular in extrusion processes.

Surprisingly, this object has been achieved by pigment compositions in accordance with the present invention.

The invention therefore relates to a pigment composition for pigmenting plastics comprising one or more flake-form effect pigments, a carrier material and one or more fluorine-containing polymers. The present invention furthermore relates to a process for the preparation of the pigment composition according to the invention in which one or more flake-form effect pigments are mixed with a carrier material and one or more fluorine-containing polymers. This invention likewise relates to the use of the pigment composition according to the invention for pigmenting plastics and for the production of masterbatches.

The pigment composition according to the invention proves to be particularly advantageous for incorporation into plastics, in particular into those which are processed by extrusion processes. Effect pigment-containing moldings obtained in this way exhibit only a small number of fisheyes, or none at all, which is not always possible with pigment compositions from the prior art. The reject rate in production can thus be significantly reduced, which significantly reduces the manufacturer's costs. In addition, the pigment compositions according to the invention are non-dusting and very free-flowing, which reduces the equipment complexity in their processing. The plastics processor can convert the pigment composition directly into masterbatches or compounds or employ it directly in the form of masterbatches and does not have to carry out any time-consuming and expensive optimization of the extrusion mixture. Furthermore, fisheye-free processing can be carried out independently of the machine, i.e. the user is not restricted to a certain extrusion line, but instead can achieve comparable results in different plants.

The flake-form effect pigments in the present invention can be pearlescent pigments, metal-effect pigments, multilayered pigments having transparent, semi-transparent and/or opaque layers, holographic pigments, BiOCl pigments and/or LCP pigments.

Pearlescent pigments, metal-effect pigments or multilayered pigments having transparent, semi-transparent and/or opaque layers which can be employed in accordance with the present invention are based, in particular, on supports, which are preferably in flake form. For example, flake-form $TiO_2$, synthetic or natural mica, glass flakes, metal flakes, flake-form $SiO_2$, $Al_2O_3$ or flake-form iron oxide are suitable. The metal flakes can consist, inter alia, of aluminum, titanium, bronze, steel or silver, preferably aluminum and/or titanium. The metal flakes here may have been passivated by corresponding treatment. In a preferred embodiment, the support may have been coated with one or more transparent, semi-transparent and/or opaque layers comprising metal oxides, metal oxide hydrates, metal suboxides, metals, metal fluorides, metal nitrides, metal oxynitrides or mixtures of these materials. The metal oxide, metal oxide hydrate, metal suboxide, metal, metal fluoride, metal nitride or metal oxynitride layers or the mixtures thereof can have low refractive indexes (refractive index<1.8) or high refractive indexes (refractive index≧1.8). Suitable metal oxides and metal oxide hydrates are all metal oxides and metal oxide hydrates known to the person skilled in the art, such as, for example, aluminum oxide, aluminum oxide hydrate, silicon oxide, silicon oxide hydrate, iron oxide, tin oxide, cerium oxide, zinc oxide, zirconium oxide, chromium oxide, titanium oxide, in particular titanium dioxide, titanium oxide hydrate and mixtures thereof, such as, for example, ilmenite or pseudobrookite. Metal suboxides which can be employed are, for example, titanium suboxides. Suitable metals are, for example, chromium, aluminum, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum. Preference is given to the application of metal oxide, metal, metal fluoride and/or metal oxide hydrate layers and very particularly preferably metal oxide and/or metal oxide hydrate layers to the support. Furthermore, multilayered structures comprising high- and low-refractive-index metal oxide, metal oxide hydrate, metal or metal fluoride layers may also be present, preferably with high- and low-refractive-index layers alternating. Particular preference is given to layer packages comprising a high-refractive-index layer and a low-refractive-index layer, it being possible for one or more of these layer packages to be applied to the support. The sequence of the high- and low-refractive-index layers can be matched to the support here in order to include the support in the multilayered structure. In a further embodiment, the metal oxide, metal oxide hydrate, metal suboxide, metal, metal fluoride, metal nitride or metal oxynitride layers can be mixed or doped with colorants or other elements. Suitable colorants or other elements are, for example, organic or inorganic colored pigments, such as colored metal oxides, for example magnetite, chromium oxide or colored pigments, such as, for example, Berlin Blue, ultramarine, bismuth vanadate, Thenard's Blue, or alternatively organic colored pigments, such as, for example, indigo, azo pigments, phthalocyanines or alternatively Carmine Red, or elements, such as, for example, yttrium or antimony. Effect pigments comprising these layers exhibit a wide variety of colors with respect to their mass tone and can in many cases exhibit an angle-dependent change in the color (color flop) due to interference.

In a preferred embodiment, the outer layer on the support is a high-refractive-index metal oxide. This outer layer may additionally be on the above-mentioned layer packages or may be part of a layer package in high-refractive-index supports and can, for example, consist of $TiO_2$, titanium suboxides, $Fe_2O_3$, $SnO_2$, ZnO, $ZrO_2$, $Ce_2O_3$, CoO, $Co_3O_4$, $V_2O_5$, $Cr_2O_3$ and/or mixtures thereof, such as, for example, ilmenite or pseudobrookite. $TiO_2$ is particularly preferred.

Examples and embodiments of the above-mentioned materials and pigment structures are also given, for example, in Research Disclosures RD 471001 and RD 472005, the disclosure content of which is incorporated herein by way of reference.

The thickness of the metal oxide, metal oxide hydrate, metal suboxide, metal, metal fluoride, metal nitride or metal oxynitride layers or a mixture thereof is usually from 3-300 nm and in the case of the metal oxide, metal oxide hydrate, metal suboxide, metal fluoride, metal nitride or metal oxynitride layers or a mixture thereof is preferably from 20-200 nm. The thickness of the metal layers is preferably from 4-50 nm.

The size of the supports and thus of the effect pigments is not crucial per se. Flake-form supports and/or flake-form supports coated with one or more transparent or semi-transparent metal oxide, metal or metal fluoride layers generally have a thickness of between 0.05-5 µm, in particular between 0.1-4.5 µm. The dimension in the length or width is usually between 1-250 µm, preferably between 2-200 µm and in particular between 2-100 µm.

The proportion of flake-form effect pigments in the pigment composition according to the invention is generally between 60%-85% by weight, preferably between 65%-75% by weight, based on the pigment composition. The optimum proportions can easily be determined by the person skilled in the art and depend essentially on the particle size of the effect pigments employed, the form factor of the effect pigments and the type of pigment structure. The highest possible proportion of effect pigments or the lowest possible proportion of carrier material is desirable in order to incorporate as little foreign material as possible into the plastic to be pigmented. However, sufficient carrier material must be used to ensure the desired properties of the pigment composition according to the invention, such as, for example, prevention of fisheye formation, non-dusting and improved flowability. To this end, the particles must not only be sheathed with the carrier material, but must also be stuck to one another to form a free-flowing coarse "powder." The pigment compositions according to the invention can of course not only be in the form of a powder, but also in a different form, for example granules.

The carrier material may be polar, but also nonpolar and may include polyolefins, polyolefin derivatives, styrene polymers, vinyl chloride polymers, acrylate polymers, polyacetals, polyamides, polyurethanes, copolymers and/or waxes. The melting range of the carrier material should be between 70° C.-200° C., preferably between 80° C.-160° C. and very particularly preferably between 90° C.-140° C. In the pigment composition according to the invention, the flake-form effect pigments, the carrier material and the fluorine-containing polymer are in the form of a mixture with one another. The flake-form effect pigment is preferably at least partially or fully coated or sheathed by the carrier material. Full sheathing by and "adhesive bonding" of the flake-form effect pigment to the carrier material is very particularly preferred. The fluorine-containing polymer here is preferably completely dispersed in the carrier material.

Examples of the said materials are polyethylene homopolymers of various density, crosslinked or chlorinated polyethylenes, polypropylenes, polybutenes, polyisobutylenes or poly-4-methylpentenes. Further examples of the above-mentioned polymers are given in Saechtling, *Kunststoff Taschenbuch* [Plastics Pocketbook], 27th Edition, Carl Hanser Verlag.

Suitable carrier materials are furthermore copolymers and/or waxes. The term copolymers is taken to mean polymers formed from more than one type of monomer. Suitable for the pigment composition according to the invention are bi-, tri- or quaterpolymers, as well as alternating, random, gradient, block or graft copolymers.

Examples of copolymers are, for example, copolymers and terpolymers of, for example, ethylene or propylene with vinyl acetate, acrylate or acrylic acid comonomers, polyvinyl alcohol copolymers, polyvinyl ether copolymers, polyvinylpyrrolidone copolymers, polyethylene oxide copolymers, acrylonitrile copolymers, methyl methacrylate copolymers, polyacetal copolymers, but also polyamide copolymers and/or polyurethane copolymers. Examples of copolymers which can be employed are ethylene-propylene copolymers, ethylene-vinyl acetate copolymers, ethylene-acrylic acid copolymers or ethylene-vinyl alcohol copolymers.

Suitable waxes for the carrier material in the present invention are all waxes known to the person skilled in the art, which can be natural or synthetic waxes. Suitable natural waxes are fossil and non-fossil waxes. Examples of fossil waxes are petroleum waxes or montan waxes, which may also be chemically modified. Examples of non-fossil waxes are animal and vegetable waxes. Synthetic waxes are, for example, amide waxes or polyolefin waxes (for example PE waxes), which may also be chemically modified. The waxes employed are preferably PE waxes, montan waxes and derivatives thereof as well as amide waxes.

The above-mentioned materials can be used as carrier material alone or in the form of a mixture, there being no restrictions with respect to the mixture regarding the mixing ratio and the choice of the materials employed. In a preferred embodiment of the present invention, the carrier material is polyethylene or PE wax.

An essential constituent of the pigment composition according to the invention is the one or more fluorine-containing polymers. Fluorine-containing polymers which are suitable in accordance with the present invention include, for example, polytetrafluoroethylenes, polyfluoroethylenepropylenes, perfluoroalkoxy polymers, polyvinylidene fluorides, polyvinyl fluorides, polychlorotrifluoroethylenes, tetrafluoro-ethylene-hexafluoropropylene-vinylidene fluoride copolymers, copolymers of fluorine-containing monomers and unfluorinated monomers, or mixtures thereof, such as, for example, ethylene-tetrafluoroethylene copolymers, tetrafluoroethylene-propylene copolymers, or ethylene-chlorotrifluoroethylene copolymers. The fluorine-containing polymers can also be in the form of mixtures or comprise other additional additives. Further examples and more detailed specifications of the fluorine-containing polymers which can be employed are given, for example, in WO 98/30619 or WO 02/066544 and the references cited therein, which are hereby incorporated into this application by way of reference. Suitable fluorine-containing polymers or polymer mixtures are commercially available, for example under the trade names Zonyl® (E.I. du Pont de Nemours and Company), Dynamar® and Dyneon® (3M) or Viton® Free Flow (DuPont Dow Elastomers).

The proportion of fluorine-containing polymers can be from 0.5%-10% by weight, based on the pigment composition, preferably in the range from 2%-7.5% by weight. The upper limit for the proportion is determined here more by the price than by the function. Relatively high contents are possible in principle, but do not improve the result from a technical point of view with respect to avoiding fisheyes in the end product.

In a further embodiment, the pigment composition can comprise further additives and/or auxiliaries as are conventional for use in plastics. Additives and/or auxiliaries of this type can be lubricants, release agents, stabilizers, antistatics, flame retardants, colorants, flexibilizers and plasticizers, adhesion promoters, blowing agents, antioxidants, UV absorbers, organic polymer-compatible solvents and/or surfactants, such as, for example, diisooctyl phthalate, phenol derivatives, mineral oils. An overview of the additives and auxiliaries which can be employed is given in Saechtling, *Kunststoff Taschenbuch* [Plastics Pocketbook], 27th Edition, Carl Hanser Verlag, or by R. Wolf in "Plastics, Additives" in *Ullmann's Encyclopaedia of Industrial Chemistry*, Internet Edition, 7th Edition, 2003.

The pigment composition according to the invention can be prepared in an uncomplicated manner. The present invention thus also relates to a process for the preparation of the pigment composition according to the invention in which one or more flake-form effect pigments, one or more fluorine-containing polymers and a carrier material are mixed. The individual components here can be added simultaneously or successively. The flake-form effect pigments which can be employed, the carrier material and the fluorine-containing polymers have already been mentioned above in the description of the pigment composition.

Thus, in accordance with the process according to the invention, the effect pigment can, for example, be initially introduced and mixed simultaneously or successively with the carrier material and fluorine-containing polymer or suspensions of the carrier material and fluorine-containing polymers. If the carrier material and/or fluorine-containing polymer are added in the form of a suspension, the effect pigment can also be dispersed in this suspension and the solvent evaporated. The choice of solvent is made in an obvious manner by the person skilled in the art taking into account the solubility of the carrier material employed. Precipitation of the carrier material from an aqueous dispersion by changing the pH is likewise possible. It is furthermore possible to prepare the pigment composition by melting the carrier material. Melting of the carrier material is particularly preferred in the present invention since it enables the use of solvents to be avoided.

In a particularly preferred embodiment, the fluorine-containing polymer is firstly mixed with the carrier material, for example in a tumble mixer, and subsequently, for example in a twin-screw extruder, melted, dispersed and extruded. After this mixture has been ground to give a powder, it can be mixed with the flake-form effect pigment in a mixer to give a uniform distribution and bond, preferably by melting under the action of heat. In this way, particularly good distribution of fluorine-containing polymer and pigment in the carrier material is achieved, which has an advantageous effect on the later extrusion properties.

The preparation of the pigment composition according to the invention by melting is carried out at temperatures of from 70° C.-240° C. The process is preferably carried out at temperatures above the melting point of the carrier material. In this way, particularly good mixing of pigment, carrier material and fluorine-containing polymer is achieved.

In a further embodiment of the process according to the invention, further additives and/or auxiliaries which are conventional in the processing of plastics can be added to the mixture of flake-form effect pigment, fluorine-containing polymer and carrier material. Examples of additives and/or auxiliaries of this type have been mentioned above in the description of the pigment composition. The time of addition of the additives and/or auxiliaries can be optimized in a manner known to the person skilled in the art.

After removal of the solvent or after cooling of the mixture of carrier material and fluorine-containing polymer applied during melting, the pigment composition is in the form of a free-flowing, coarsely particulate powder which can be further processed well.

The present invention likewise relates to the use of the pigment composition according to the invention for the direct pigmentation of plastics and for the production of masterbatches.

Direct incorporation of the pigment composition according to the invention into the plastic is carried out by mixing the plastic granules and/or powder with the pigment composition. The plastic pigmented with the pigment composition according to the invention is subsequently shaped or extruded under the action of heat. Furthermore, further additives and pigments can optionally be added to the plastic granules and/or powder during incorporation of the pigment composition. Examples of additives of this type have been mentioned above in the description of the pigment composition. Suitable pigments are all inorganic or organic pigments known to the person skilled in the art.

The plastic granules and/or powder/pigment mixture is generally prepared by a process in which the plastic granules and/or powder is/are introduced into a suitable mixer, for example tumble or high-speed mixer, and wetted with any additives, and the pigment composition is then added and mixed in.

Suitable for use of the pigment composition according to the invention is a whole series of plastics, in particular thermoplastics. The plastics can be polar plastics or nonpolar (for example olefinic) plastics. Examples of suitable plastics are given, for example, in Saechtling, *Kunststoff Taschenbuch* [Plastics Pocketbook], 27th Edition, Carl Hanser Verlag.

The pigment composition according to the invention can also advantageously be employed for the production of masterbatches. In this way, maximum demands of pigment dispersal can also be met. The masterbatches can be produced either continuously or batchwise, preferably continuously, for example through the use of twin-screw extruders. The use of powders or grit of the respective plastics is advantageous in the production of masterbatches. Thus, for example, on use of the pigment composition according to the invention itself in a single-screw extruder, masterbatches having a pigment content of up to 40% by weight, based on the masterbatch, can be produced.

The pigment composition according to the invention is preferably employed for the production of masterbatches.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

Example 1

Preparation of the Pigment Composition

10% by weight of a fluorine-containing polymer (for example Dyneon® FX-5911X from 3M) are mixed with 90% by weight of a commercially available PE wax powder (for example Luwax® AH 3 from BASF AG) in a tumble mixer and subsequently melted and extruded in a twin-screw extruder. The fluorine-containing polymer is then in dispersed form in the PE wax. After this material has been ground to give a powder, 30% by weight thereof are pre-mixed with 70% by weight of Iriodin® Brilliant Pearl and mixed at a temperature of 150° C. in a mixer until pigment and fluorine-containing polymer are uniformly distributed and bonded.

Example 2

Production of a Masterbatch 42.8% by weight of the pigment composition from Example 1 are converted into a masterbatch with 0.3% by weight of Pigment Red 143 and 56.9% by weight of polyethylene (PE-LLD).

Example 3

Further Processing By Extrusion of the Masterbatch

5% by weight of the masterbatch from Example 2 are converted into a compound with 95% by weight of a high-density polyethylene (PE-HD) and converted into PE bottles in a blowing plant. Fisheye-free bottles are obtained.

Comparative Example

A masterbatch comprising 69.7% by weight of a polyethylene (PE-LLD), 30% by weight of Iriodin® Brilliant Pearl and 0.3% by weight of Pigment Red 143 is added to a PE-HD in an amount of 5% by weight and converted into PE bottles in a blowing plant. Numerous bottles contain fisheyes, predominantly comprising pearlescent pigment, which are visible to the naked eye. In the case of some fisheyes, the bottle wall even fractures under light mechanical load. The masterbatch as such was fisheye-free here.

The entire disclosure of all applications, patents and publications, cited herein and of corresponding German application No. 10345647.3, filed Oct. 1, 2003 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A pigment composition comprising one or more flake-form effect pigments, a carrier material and one or more fluorine-containing polymers, wherein the proportion of flake-form effect pigments, based on the pigment composition, is 60%-85% by weight.

2. A pigment composition according to claim 1, wherein one or more the flake-form effect pigments are pearlescent pigments, metal-effect pigments, multilayered pigments having transparent, semi-transparent and/or opaque layers, holographic pigments, BiOCl pigments and/or LCP pigments.

3. A pigment composition according to claim 1, wherein the proportion of flake-form effect pigments, based on the pigment composition, is 65%-75% by weight.

4. A pigment composition according to claim 1, wherein the carrier material is a polyolefin, polyolefin derivative, styrene polymer, vinyl chloride polymer, acrylate polymer, polyacetal, polyamide, polyurethane, copolymer and/or wax.

5. A pigment composition according to claim 1, wherein the fluorine-containing polymer is a polytetrafluoroethylene, polyfluoroethylenepropylene, perfluoroalkoxy polymer, polyvinylidene fluoride, polyvinyl fluoride, polychlorotrifluoroethylene, tetrafluoroethylene-hexafluoropropylene-vinylidene fluoride copolymer, copolymer of fluorine-containing monomer and unfluorinated monomer, or a mixture thereof.

6. A pigment composition according to claim 1, wherein the proportion of fluorine-containing polymer is from 0.5%-10% by weight, based on the pigment composition.

7. A pigment composition according to claim 1, wherein the pigment composition further comprises one or more additives and/or auxiliaries.

8. A process for preparing a pigment composition according to claim 1, comprising mixing together one or more flake-form effect pigments, one or more fluorine-containing polymers and a cater material.

9. A process according to claim 8, wherein mixing is carried out in the form of a suspension or by melting.

10. A process according to claim 8, wherein mixing is carried out at a temperature of 70° C.-240° C.

11. A process according to claim 8, further comprising adding one or more additives and/or auxiliaries to the mixture.

12. A plastic article comprising a pigment composition comprising one or more flake-form effect pigments, a carrier material and one or more fluorine-containing polymers.

13. A masterbatch comprising a pigment composition comprising one or more flake-form effect pigments, a carrier material and one or more fluorine-containing polymers.

14. A method for preventing the formation of fisheyes during plastics processing, comprising adding to a plastic composition a pigment composition comprising one or more flake-form effect pigments, a carrier material and one or more fluorine-containing polymers.

15. A pigment composition according to claim 1, which is non-dusting and free-flowing.

16. A method of extruding a plastic composition, comprising mixing together a pigment composition comprising one or more flake-form effect pigments, a carrier material and one or more fluorine-containing polymers and a plastic composition and then subjecting the resultant mixture to extrusion.

17. A plastic article comprising a pigment composition according to claim 1.

18. A masterbatch comprising a pigment composition according to claim 1.

19. A method for preventing the formation of fisheyes during plastics processing, comprising adding to a plastic composition a pigment composition according to claim 1.

20. A method of extruding a plastic composition, comprising mixing together a pigment composition according to claim 1 and a plastic composition and then subjecting the resultant mixture to extrusion.

* * * * *

UNITED STATES PATENT AND TRADEMARK OFFICE
CERTIFICATE OF CORRECTION

PATENT NO. : 7,390,842 B2
APPLICATION NO. : 10/954272
DATED : June 24, 2008
INVENTOR(S) : Manfred Kieser It is certified that error appears in the above-identified patent and that said Letters Patent is hereby corrected as shown below:

Column 9, line 4 claim 8 reads "cater", should read --carrier--
Column 9, line 8 claim 10 reads "C.-240", should read --C-240--

Signed and Sealed this

Fourth Day of November, 2008

JON W. DUDAS
*Director of the United States Patent and Trademark Office*